United States Patent
Heaton

[11] Patent Number: 5,952,805
[45] Date of Patent: Sep. 14, 1999

[54] SCHEDULED STEP TIME OPTIMAL MOTION CONTROL

[75] Inventor: Mark W. Heaton, Irving, Tex.

[73] Assignee: Texas Instruments Incorporated, Dallas, Tex.

[21] Appl. No.: 08/993,810

[22] Filed: Dec. 18, 1997

Related U.S. Application Data

[60] Provisional application No. 60/033,532, Dec. 20, 1996.

[51] Int. Cl.⁶ .................................................... G05B 13/02
[52] U.S. Cl. ........................................... 318/561; 318/685
[58] Field of Search ..................................... 318/600, 601, 318/603, 138, 571, 604, 696, 685, 561

[56] References Cited

U.S. PATENT DOCUMENTS

| | | | |
|---|---|---|---|
| 3,732,480 | 5/1973 | Hendrickson et al. | 318/696 |
| 3,949,286 | 4/1976 | Appelgren | 318/571 |
| 4,287,461 | 9/1981 | Promis et al. | 318/571 |
| 4,427,930 | 1/1984 | Berman et al. | 388/811 |

*Primary Examiner*—Bentsu Ro
*Attorney, Agent, or Firm*—Warren L. Franz; Richard L. Donaldson

[57] ABSTRACT

A time optimal control system for electrical motor driven point-to-point displacement of a mechanical member uses a three step voltage application process of 1) applying full supply voltage to achieve maximum acceleration; 2) applying full supply voltage in the opposite direction to achieve maximum deceleration; and 3) removing the voltage to alter the system to decay to the final desired position. The scheduling of the steps 2) and 3) is determined during step 1) by continuously calculating a predicted final position that would occur if the supply voltage were reversed at that moment, given the then current system velocity and acceleration, and comparing the predicated final position with the desired final position.

5 Claims, 4 Drawing Sheets

SCHEDULED STEP TIME OPTIMAL MOTION CONTROL

Priority is claimed under 35 U.S.C. § 119(e)(1) of provisional U.S. Ser. No. 60/033,532 filed Dec. 20, 1996, entitled "Scheduled Steps for Time Optimal Motion Control," the entirety of which is incorporated herein by reference.

This invention relates generally to motion control systems and, in particular, to time optimal control of point-to-point motion of an electrically driven mechanically actuated displacement member, or the like.

BACKGROUND OF THE INVENTION

Time optimal (minimum time) control is a common mode of operation in many systems employing an electrically driven, mechanical displacement member such as hard disk drive and robotics systems. This operation mode, called a "seek," demands point-to-point motion in the shortest possible time, without overshoot. Typically, a velocity profile technique based on constant acceleration equations is misapplied to accomplish this objective. Performance of this technique is, however, limited by system dynamics assumed to be negligible. These dynamics are common in systems driven by DC motors and characterized with an electrical and a mechanical time constant.

SUMMARY OF THE INVENTION

The invention provides a scheduled step time optimal motion control method that differs from the traditional velocity profile approach.

The proposed technique schedules a series of three step commands to the system to provide point-to-point displacement in minimum time. The first step applies full supply voltage to achieve maximum acceleration in the desired direction. The second step applies full supply voltage in the opposite direction to achieve maximum deceleration. The third step removes the voltage, to allow the system to decay to the desired final position, without overshoot. The timing for the second and third steps is scheduled during the first step, by continuously calculating a predicted final position and comparing it to the desired final position. Application of the final step (magnitude zero) is timed such that all states (position, rate, acceleration jerk, etc.) exponentially decay to zero at a time constant approximated by the electrical time constant of the system. An exemplary implementation is described below and compared to the performance of the traditional velocity profile method.

BRIEF DESCRIPTION OF THE DRAWINGS

Embodiments of the invention have been chosen for purposes of illustration and description, and are described with reference to the accompanying drawings, wherein.

DETAILED DESCRIPTION OF THE PREFERRED EMBODIMENTS

Figure 1:
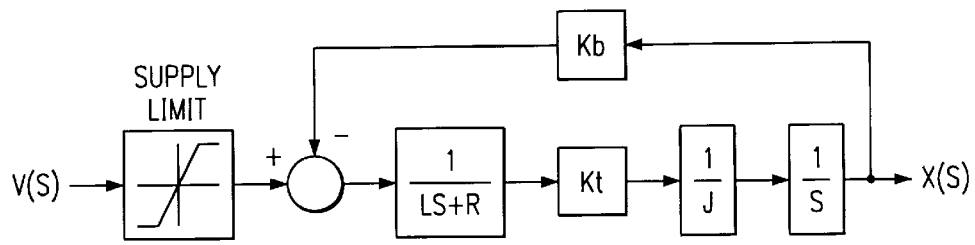
FIG. 1 is a system block diagram of a typical control system.

FIG. 1 shows a system block diagram of a common control system. A voltage input (V(S)), limited by the power supply, is applied across the voice coil or DC motor windings. These motors can be accurately characterized by a single pole (L/R, seconds or electrical time constant), a torque constant (Kt, in-oz/amp), and a Back EMF constant (Kb, Volts/(rad/sec)). The load inertia J accelerates in response to applied motor torques or forces creating the velocity output (X(S)).

In an illustrative implementation, such as for an actuator in a disk drive system, for representative parameters, output velocity (X/S) is given in Rad/Sec, voltage V(S) is ±12 Volts, motor torque constant $K_t$ is 14.2 oz-in/amp, motor Back EMF constant $K_b$ is 0.0015H, motor resistance R is 8 ohms, and load inertia J is 0.001 oz-in-sec².

Figure 2:
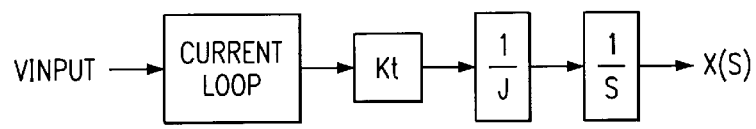
FIG. 2 is a block diagram of an approximation of the system of FIG. 1.

A widely used system approximation is shown in FIG. 2. This approximation allows constant acceleration equations to control the load. Voltage inputs to the high bandwidth current loop are directly proportional to torque (force) which is directly proportional to the product of inertia and acceleration. However, the assumptions made for this approximation involve neglecting inductance and Back EMF effects due to the use of a high bandwidth current loop. These parameters are not negligible in the time optimal (minimum time) control mode. Coil inductance "stores" current such that torque applied to the inertia lags the desired commands defined by velocity profile algorithms. Back EMF voltages resist velocity by applying a voltage that results in a retarding torque that reduces acceleration but increases deceleration. As a result, the time optimal (minimum time) goal is compromised in order to minimize overshoot.

Linear small signal analysis techniques creating high bandwidth current loops have limited use in the time optimal control problem. Regardless of the controller used, once the power supply saturates during a large magnitude step response, the loop essentially "opens up" to yield the system shown in FIG. 1. This is the system to understand in order to solve the time optimal (minimum time) control problem.

Figure 3:
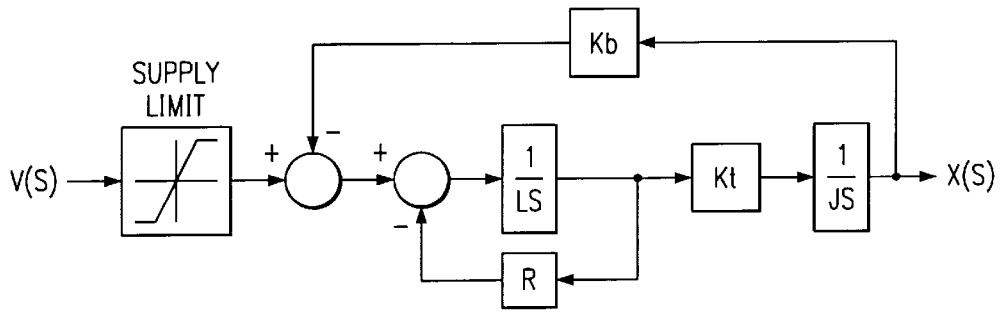
FIG. 3 is a block diagram of a modified form of the system of FIG. 1.

FIG. 3 is a variation of FIG. 1, modified to illustrate the coupled energy storage elements in the system. Minimum time control suggests that maximum supply voltage is applied to accelerate the inertia as quickly as possible, followed by maximum supply voltage in the opposite direction to decelerate the inertia. Throughout this process of applying voltage steps, the inductance in the coil has been "storing" current while the inertia has been "storing" momentum or velocity. During a deceleration (assume a positive seek), velocity is decreasing positive while the current or acceleration is negative. This suggests that for this system to achieve a condition of rest, these two opposing energies must "absorb" each other. In other words, no more energy from the power supply should be applied once the energy stored in the inertia is equal and opposite to the energy stored in the inductance of the coil. The three scheduled steps for the time optimal (minimum time) control approach are:

1) First, apply full supply voltage to achieve maximum acceleration in the desired direction. Scheduling for steps two and three is determined by continuously calculating the final position of the system if the supply voltage was reversed given current system velocity and acceleration. When final position equals desired position advance to step two.

2) Next, apply full supply voltage in the opposite direction to that applied in step one to achieve maximum deceleration. The duration of this step is determined in step one.

3) Remove the external inputs (step of zero magnitude) to allow the system to decay to the final position without overshoot, as predicted in step one.

Mathematical analysis of this system leads to equations that define the proper sequence of commands to minimize time and eliminate overshoot. Intermediate steps not shown can be readily determined using analytical processes set forth in standard control systems texts.

Performing block diagram algebra on the system shown in FIG. 3 results in the Laplace domain transfer function of velocity output and voltage input shown in equation (1) below.

$$\frac{X(S)}{V(S)} = \frac{\frac{K_t}{LJ}}{S^2 + \frac{R}{L}S + \frac{K_t K_b}{LJ}} \quad (1)$$

This transfer function results in a second order system with a natural frequency and a damping ratio as defined in equation (2).

$$\frac{X(S)}{V(S)} = \frac{K\omega^2}{S^2 + 2\zeta\omega S + \omega^2} \quad (2)$$

where:

$$K = \frac{1}{K_b}$$

$$\omega = \sqrt{\frac{K_t K_b}{LJ}} = \text{Natural Frequency}. 973 \text{ rad/sec}$$

$$\zeta = \frac{R}{2L\omega} = \text{Damping Ratio}, 2.74$$

Substitution of plant parameters yields a natural frequency of 973 rad/sec and a damping ratio of 2.73 ("overdamped"). Equation (3) is the velocity output response to an input driving function (V(S)) given initial conditions for velocity ($x_0$) and acceleration ($\dot{x}_0$).

$$x(S) = \frac{K\omega^2 V(S)}{S^2 + 2\zeta\omega S + \omega^2} + \frac{(S + 2\zeta\omega)x_0}{S^2 + 2\zeta\omega S + \omega^2} + \frac{\dot{x}_0}{S^2 + 2\zeta\omega S + \omega^2} \quad (3)$$

The interest is in responses to step inputs from the voltage supply which are represented in equation (4) with a factored form showing the two poles in equation (5).

$$x(S) = \frac{K\omega^2 V_{step}}{S(S^2 + 2\zeta\omega S + \omega^2)} + \frac{(S + 2\zeta\omega)x_0}{S^2 + 2\zeta\omega S + \omega^2} + \frac{\dot{x}_0}{S^2 + 2\zeta\omega S + \omega^2} \quad (4)$$

$$x(S) = \frac{K\omega^2 V_{step}}{S\left(S + \left(\zeta + \sqrt{\zeta^2 - 1}\right)\omega\right)\left(S + \left(\zeta - \sqrt{\zeta^2 - 1}\right)\omega\right)} + \frac{(S + 2\zeta\omega)x_0}{\left(S + \left(\zeta + \sqrt{\zeta^2 - 1}\right)\omega\right)\left(S + \left(\zeta - \sqrt{\zeta^2 - 1}\right)\omega\right)} + \frac{\dot{x}_0}{\left(S + \left(\zeta + \sqrt{\zeta^2 - 1}\right)\omega\right)\left(S + \left(\zeta - \sqrt{\zeta^2 - 1}\right)\omega\right)} \quad (5)$$

Substitution for the poles yields equation (6).

$$x(S) = \frac{K\omega^2 V_{step}}{S(S + \beta_1)(S + \beta_2)} + \frac{(S + 2\zeta\omega)x_0}{(S + \beta_1)(S + \beta_2)} + \frac{\dot{x}_0}{(S + \beta_1)(S + \beta_2)} \quad (6)$$

where:

$$\beta_1 = \left(\zeta + \sqrt{\zeta^2 - 1}\right)\omega = 5150 \text{ rad/sec}$$

$$\beta_2 = \left(\zeta - \sqrt{\zeta^2 - 1}\right)\omega = 184 \text{ rad/sec}$$

The inverse Laplace transform of equation (6) yields the time (t) domain step response of velocity with initial conditions ($x_0$ and $\dot{x}_0$). Equations (7), (8), and (9) calculate velocity, acceleration, and position respectively in response to step inputs.

$$x(t) = KV_{step}\left[1 - \frac{\omega}{2\sqrt{\zeta^2 - 1}}\left(\frac{e^{-\beta_1 t}}{-\beta_1} - \frac{e^{-\beta_2 t}}{-\beta_2}\right)\right] + \frac{1}{2\omega\sqrt{\zeta^2 - 1}}\{[-\beta_2 x_0 - \dot{x}_0]e^{-\beta_1 t} + [\beta_1 x_0 + \dot{x}_0]e^{-\beta_2 t}\} \quad (7)$$

$$\dot{x}(t) = KV_{step}\left[-\frac{\omega}{2\sqrt{\zeta^2 - 1}}(e^{-\beta_1 t} - e^{-\beta_2 t})\right] + \frac{1}{2\omega\sqrt{\zeta^2 - 1}}\{[-\beta_2 x_0 - \dot{x}_0](-\beta_1)e^{-\beta_1 t} + [\beta_1 x_0 + \dot{x}_0](-\beta_2)e^{-\beta_2 t}\} \quad (8)$$

$$\int x(t)dt = KV_{step}\left[t - \frac{\omega}{2\sqrt{\zeta^2 - 1}}\left(\frac{(e^{-\beta_1 t} - 1)}{(-\beta_1)^2} - \frac{(e^{-\beta_2 t} - 1)}{(-\beta_2)^2}\right)\right] + \frac{1}{2\omega\sqrt{\zeta^2 - 1}}\left\{\frac{[-\beta_2 x_0 - \dot{x}_0](e^{-\beta_1 t} - 1)}{-\beta_1} + \frac{[\beta_1 x_0 + \dot{x}_0](e^{-\beta_2 t} - 1)}{-\beta_2}\right\} \quad (9)$$

These are the equations used in the scheduled step method to determine scheduling of step commands. Recalling that during step three the input magnitude is zero ($V_{step}=0$), velocity, acceleration, and position equations reduce to equations (10), (11), and (12), respectively.

$$\hat{x}(t) = \frac{1}{2\omega\sqrt{\zeta^2 - 1}}\{[-\beta_2 x_0 - \dot{x}_0]e^{-\beta_1 t} + [\beta_1 x_0 + \dot{x}_0]e^{-\beta_2 t}\} \quad (10)$$

$$\dot{x}(t) = \frac{1}{2\omega\sqrt{\zeta^2 - 1}}\{[-\beta_2 x_0 - \dot{x}_0](-\beta_1)e^{-\beta_1 t} + [\beta_1 x_0 + \dot{x}_0](-\beta_2)e^{-\beta_2 t}\} \quad (11)$$

$$\int x(t)dt = \frac{1}{2\omega\sqrt{\zeta^2 - 1}}\left\{\frac{[-\beta_2 x_0 - \dot{x}_0](e^{-\beta_1 t} - 1)}{-\beta_1} + \frac{[\beta_1 x_0 + \dot{x}_0](e^{-\beta_2 t} - 1)}{-\beta_2}\right\} \quad (12)$$

Studying these states of the final phase reveals an interesting relationship between the initial conditions and the decay of the states of the system. Note that if the initial conditions for velocity ($x_0$) and acceleration ($\dot{x}_0$) have the relationship shown in equation (13), $$\dot{x}_0 = -\beta_1 x_0 \quad (13)$$

only one exponential remains in the equations for defining velocity equation (14), $$x(t) = \frac{1}{2\omega\sqrt{\zeta^2 - 1}} [-\beta_2 x_0 - \dot{x}_0] e^{-\beta_1 t} \quad (14)$$

acceleration (equation 15), $$\dot{x}(t) = \frac{d(x(t))}{dt} = \frac{1}{2\omega\sqrt{\zeta^2 - 1}} [-\beta_2 x_0 - \dot{x}_0](-\beta_1) e^{-\beta_1 t} \quad (15)$$

jerk (equation 16), $$\ddot{x}(t) = \frac{d^2(x(t))}{dt^2} = \frac{1}{2\omega\sqrt{\zeta^2 - 1}} [-\beta_2 x_0 - \dot{x}_0](-\beta_1)^2 e^{-\beta_1 t} \quad (16)$$

and position (equation 17), $$\int x(t)dt = \frac{1}{2\omega\sqrt{\zeta^2 - 1}} [-\beta_2 x_0 - \dot{x}_0] \frac{(e^{-\beta_1 t} - 1)}{-\beta_1} \quad (17)$$

All states decay exponentially at the same rate if inputs go to zero when the initial conditions are related. For the specified system the time constant for this decay is 0.19 milliseconds. A similar result occurs if $\beta_2$ is used in equation (13); however, the decay time constant is 5.43 milliseconds.

Recognition of the significance of equation (13)? leads to the development of scheduled steps for time optimal (minimum time) control.

One relationship remains to be determined: given instantaneous states in step one (acceleration phase), what is the duration of step two in order to achieve the initial conditions constrained by equation (13)? Substituting equations (7) and (8) into equation (18) below and solving for time (t) yields equation (19).

$$\dot{x}(t) = -\beta_1 x(t) \quad (18)$$

$$t = \frac{\ln\left[\frac{\omega^2 KV_{step}}{\omega^2 KV_{step} - \beta_2(\beta_1 x_0 + \dot{x}_0)}\right]}{-\beta_2} \quad (19)$$

This interesting result presents a quite calculable equation for the time necessary to decelerate ($V_{step}=V_{decelerate}$) from current velocity ($x_0$) and acceleration ($\dot{x}_0$) to the exact conditions to initiate step three.

The scheduled steps technique will use equations (7), (8), (9), and (19) to create an input waveform that provides the time optimal (minimum time) solution.

The procedure that follows involves the use of the time domain equations defined above to determine scheduling of the three step commands necessary to result in minimum time positioning with zero overshoot. A Matlab simulation code was used to illustrate the basics of the technique and to generate the data plotted in FIG. 4.
Given:
Plant parameters as defined in FIG. 1 and relationships to establish constants $\beta_1$, $\beta_2$, $\omega$ and $\xi$ as required.
Step I
a) Input (measured/observed) desired position, present position, velocity, and acceleration.
b) Apply maximum supply voltage to accelerate in the desired direction.
c) Use equation (19) to calculate time (t) for deceleration duration (tdec).
  1) From a) use present velocity and acceleration for $x_0$ and $\dot{x}_0$, respectively
  2) The magnitude for the deceleration step is the opposite of that used for acceleration ($V_{step}=V_{decelerate}=-V_{accelerate}$)
d) With deceleration time (t) and present position, velocity, and acceleration calculate velocity, acceleration, and change in position at the end of deceleration (Step II) using equations (7), (8), and (9).
e) With velocity and acceleration at the end of deceleration (Step II) calculate change in position at the end of Step III using equation (9).
f) Sum present position with change in position during Steps II and III to obtain final position.
g) If final position is equal to or beyond the desired position advance to Step II. Otherwise repeat steps a) through g).
Step II
a) Reverse supply voltage output to system.
b) Measure elapsed time. Notice that calculations based on present state have ceased.
c) If change in time is equal to deceleration time ($t_{dec}$) advance to Step III.
Step III
a) Output zero voltage to system for three time constants ($t=3/\beta_1$ seconds) for 95% decay.

At this point the scheduled step process is complete. Criteria for handing control over to a small signal tracking control process is system dependent and not simply a function of delaying three time constants. Rather, it is likely to involve measuring/observing states to determine appropriate action.

In an exemplary simulation, the system defined in FIG. 1 is commanded to move from zero to 0.5 radians in a minimum time without overshoot using the scheduled step technique. Simulated results using the MATLAB program are presented in FIGS. 4A–4D.

Plotted in FIG. 4 is the sequence of scheduled step commands. Step one applies +12 Volts until the control process determines, at t=0.00716 seconds, that it is necessary to advance to step two. Step two reverses the input to −12 Volts for the calculated amount of time required to decelerate to the specified relationship between velocity and acceleration. This occurs at $t_{dec}$=0.01015 seconds. Step three is the input of zero for the given multiple of time constants, which releases all system states to decay without overshoot.

Figure 4A:
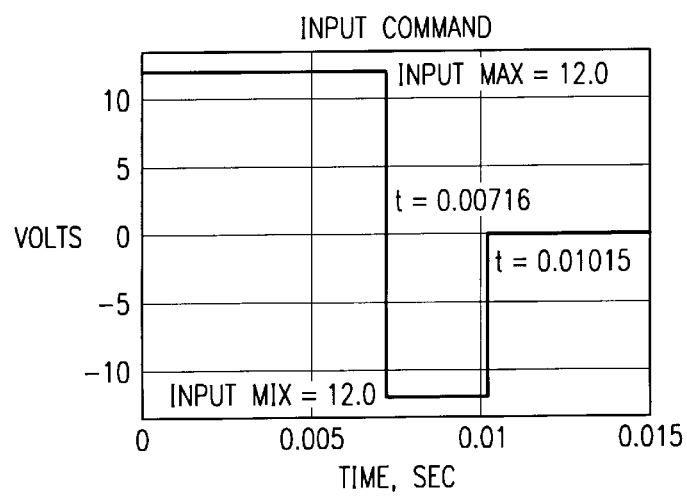
FIGS. 4A–4D are graphical representations of simulated results.
Figure 4B:
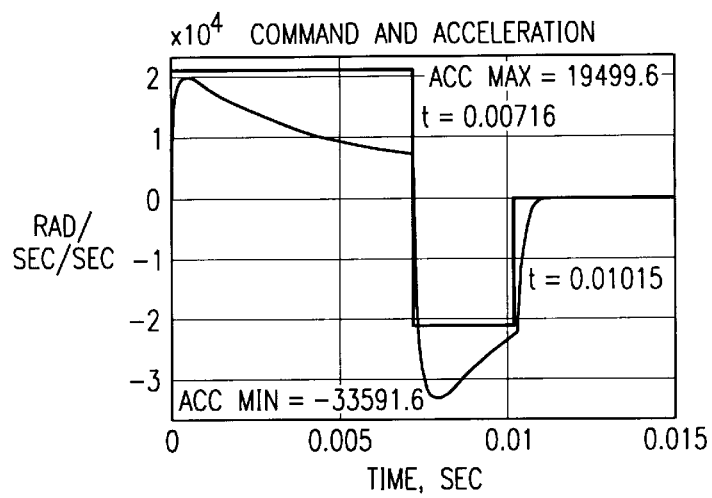

Plotted in FIG. 4B is commanded acceleration and actual acceleration. Commanded acceleration is a replot of the voltage input scaled (multiplied by $^{KT}/_{RJ}$) to present the data in units of acceleration. Actual acceleration is the non-linear curve which clearly shows the rise time impact of coil inductance and resistance and the drop of acceleration due to Back EMF effects. It is important to note that throughout step one, the scheduled step technique continuously calculates the distance to stop. Therefore, at 0.00716 seconds the control program has determined that the deceleration step (step two) must begin at that point, in order to achieve the desired position without overshoot. Unlike the velocity profile technique that assumes deceleration is constant (approximately equal to command acceleration values), the scheduled step (step two) technique takes full advantage of available Back EMF to decelerate. This plot shows that acceleration/deceleration is not at all constant.

Figure 4C:
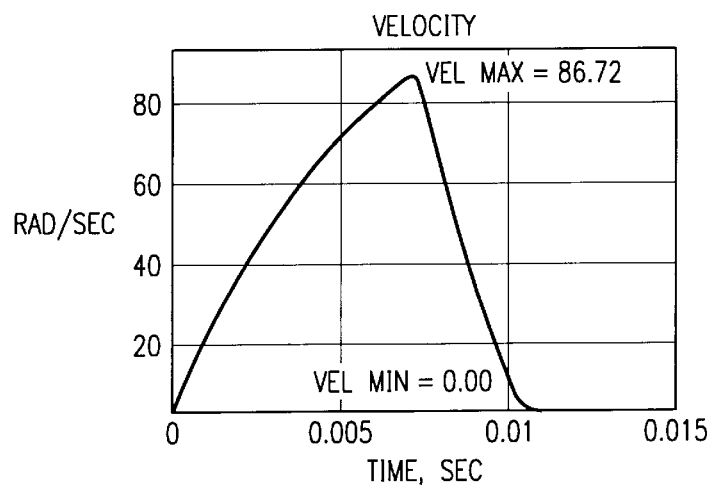

System velocity is plotted in FIG. 4C. The message again is that the actual system dynamics does not follow the constant acceleration paradigm which would suggest that velocity should be a triangle wave. Velocity is not a triangle wave; however the actual velocity response to a step input is quite calculable.

Figure 4D:
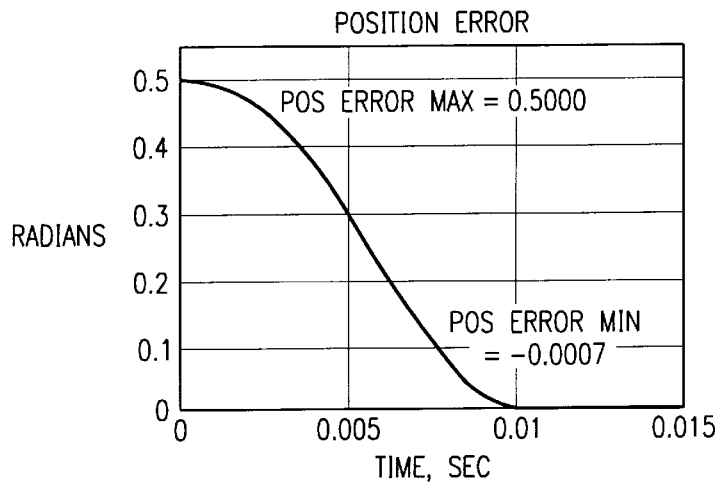

The bottom line is position control which is plotted in FIG. 4D. This curve indicates that the final position error is −0.0007 Rad. Technically this is an overshoot. It is easily explained by the simulation issue of sample time. This position error happens to be the distance traveled between the perfect deceleration time and the sampling event at 0.00716 seconds. In other words, by the time the final position was calculated and compared to the desired position at 0.00716 seconds the perfect deceleration time had passed. This sampling issue is one of several issues to consider for actual implementation.

Scheduled step control shares the same implementation issues suffered by every controller, solutions of which will vary based on application, tolerance requirements, budget, and the like. Sample frequency, measurement/observation errors, output frequency, friction coupling, structural resonance(s), calculation errors, digital signal processor (DSP) throughput, and parameter variations must be considered. As demonstrated, the mathematics for scheduled steps is exact but it is only as accurate as the inputs provided to the equations.

An implementation advantage of the scheduled step technique is that each state can be predicted (see equations (14)–(17)). This can facilitate state prediction used to accurately initialize filter states for quick settling in anticipation of post seek tracking.

Comparison of Scheduled Step and Velocity Profile Approaches

In order to compare the scheduled steps approach to the velocity profile approach, an identical plant model was used to exercise both techniques and discuss the results.

Figure 5:
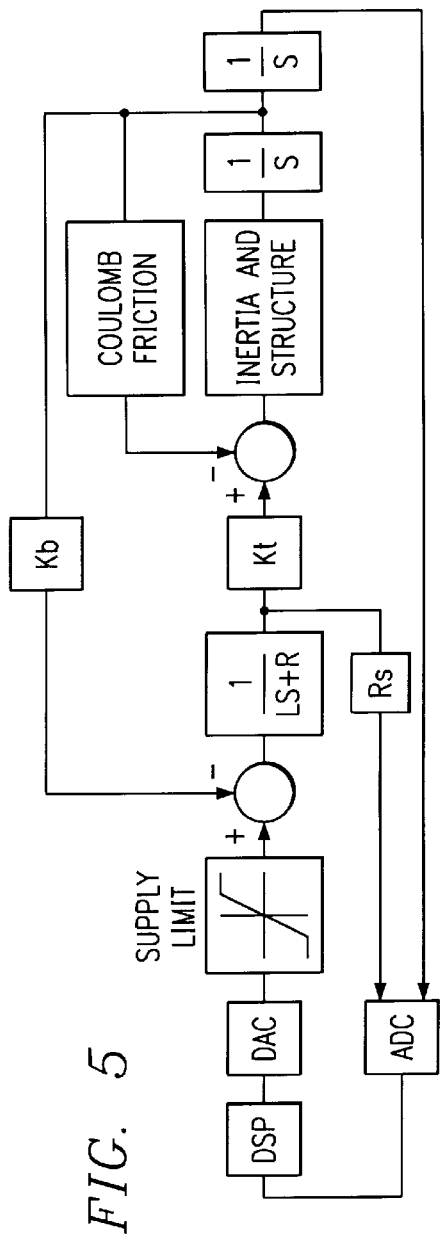
FIG. 5 is a block diagram of a non-linear system.

FIG. 5 shows a block diagram used to illustrate the performance of the scheduled step technique for time optimal (minimum time) positioning. This system architecture is representative of a hard disk drive system. The plant model, in addition to the parameters previously specified, has coulomb friction (35 Rad/Sec/Sec) and a structural resonance (4.5 kHz, "Q" of 20) commensurate with the hard disk drive application. Position and current (proportional to acceleration) are the only states measured which requires that velocity be "observed". Multi-rate sampling takes advantage of a DSP output rate (100 kHz) that is higher than the ADC sample rate (5 kHz). However, this requires that all states be predicted between samples.

Figure 6:
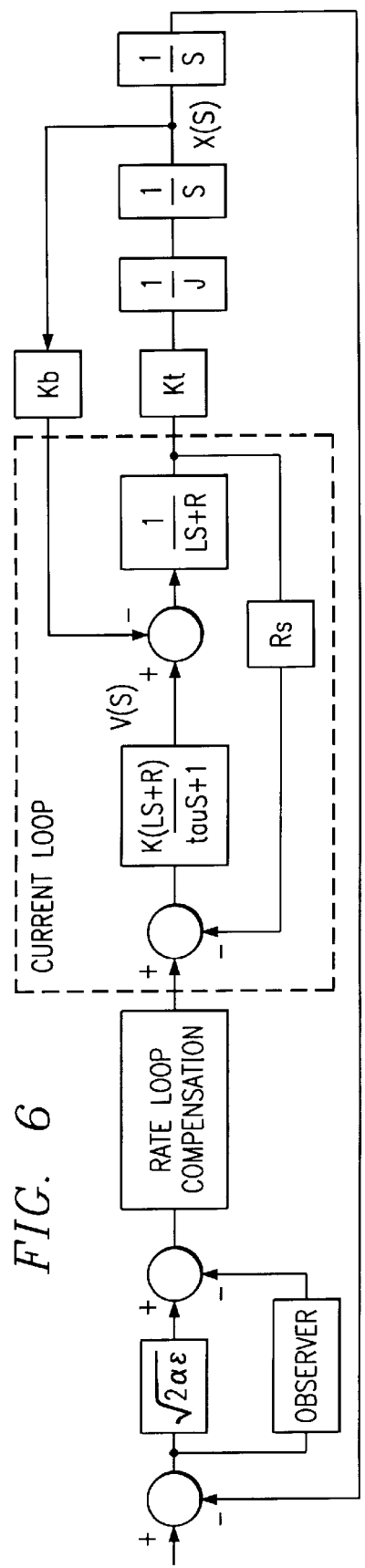
FIG. 6 is a block diagram of a velocity profile system.

A typical velocity profile system block diagram is shown in FIG. 6. A high bandwidth (5–10 kHz) current or transconductance loop is created using pole/zero cancellation techniques attempting to eliminate the effects of coil inductance and Back EMF. An observer is used to estimate a rate state from measured position error in order to provide feedback to the rate loop following the velocity profile. Finally, the velocity profile is a function of the position error ($\epsilon$) and an assumption of the "constant" deceleration capabilities of the system ($\alpha$).

Figure 7:
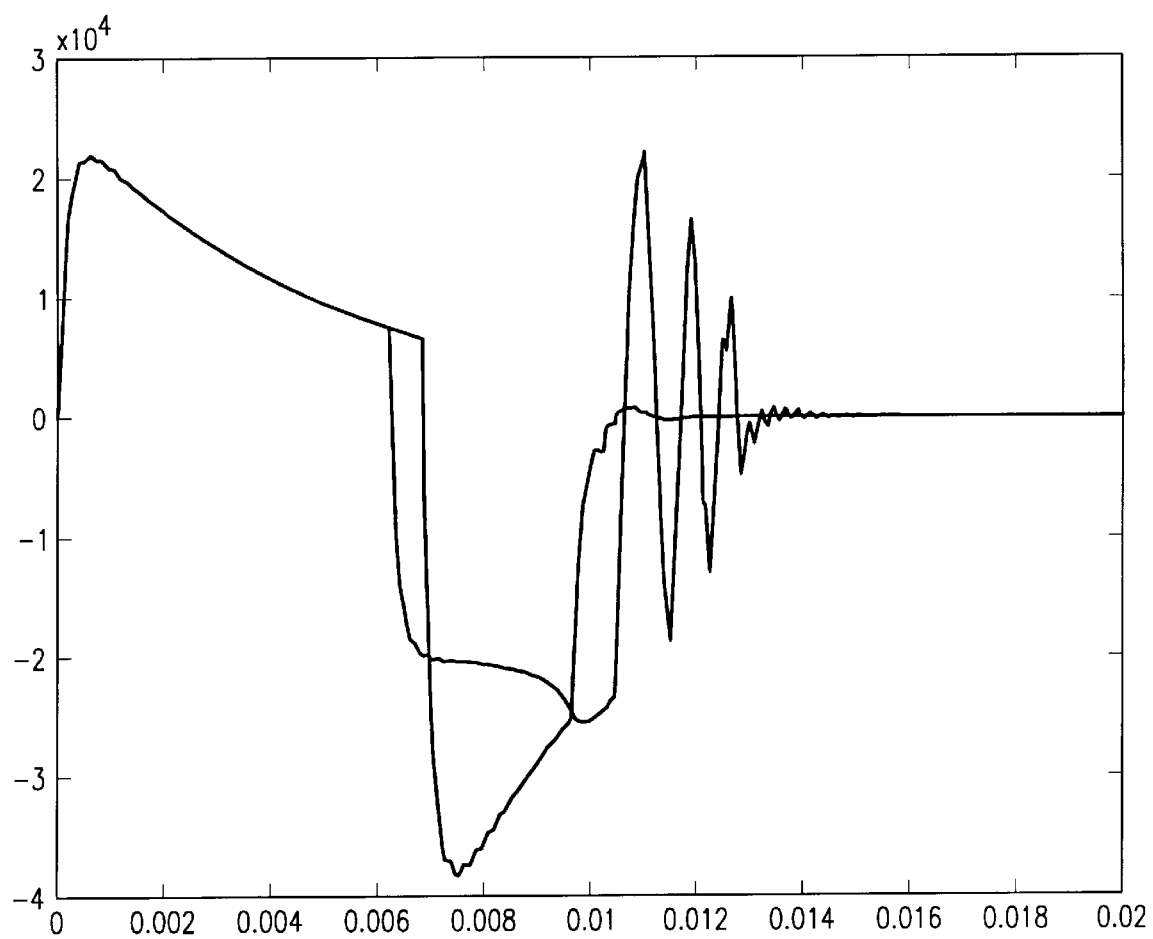
FIG. 7 is a graphical representation of a simulated acceleration comparison.

FIG. 7 plots acceleration for both the scheduled steps and the velocity profile controllers. Rather than a strict quantitative comparison, the intent is to compare characteristics of interest to time optimal control problem. During acceleration, both techniques are identical as a result of the power supply saturation discussed earlier. High frequency oscillations that occur throughout are due to the resonance in the structure. The velocity profile assumes and therefore commands a deceleration less than is actually available. As a result, deceleration for this controller must begin first as it requires more time to reduce velocity to zero. Clearly shown is the result of injecting energy into the system beyond the point where the energy stored in the coil inductance can absorb the energy stored in the inertia. Velocity profiles will attempt to maintain a constant deceleration until the position error equals zero. For these systems, when the position error goes to zero, velocity and acceleration states are charged up and overshoot is guaranteed. A softer approach to zero position error can be accomplished at the cost of precious time. On the other hand, the scheduled step system gracefully decays to zero.

The invention provides an innovative approach for time optimal (minimum time) control that determines the exact scheduling of three step commands that will result in point-to-point positioning, without overshoot. The scheduled step method assumes that the input to rate transfer function is an overdamped second order system. These dynamics are common characteristics in today's high performance positioning systems but are neglected in current position controllers at the cost of time.

Those skilled in the art to which the invention relates will appreciate that substitutions and modifications can be made to the described embodiments, without departing from the spirit and scope of the invention, as defined by the claims.

What is claimed is:

1. A time optimal motion control system for moving an electrically driven, mechanical member in point-to-point displacement, from an initial position to a desired final position, the method comprising the steps of:

applying a voltage in a three step process across windings of a DC motor, the motor characterized by an electrical time constant, a torque constant, a Back EMF constant, and a load inertia that accelerates in response to applied motor torques creating a velocity output;

the first step applying full supply voltage to achieve maximum acceleration in the desired direction;

the second step, applying full supply voltage in the opposite direction to achieve maximum deceleration; and the third step removing the voltage to allow the system to decay to the desired final position without overshoot;

scheduling of the second and third steps being determined during the first step by continuously calculating a predicted final position that would occur if the supply voltage were reversed at that moment, given the then current system velocity and acceleration, and comparing the predicated final position with the desired final position.

2. The control system of claim 1, wherein the scheduling of the second and third steps is performed according to equations (7), (8) and (9) and (19), below:

$$x(t) = KV_{step}\left[1 - \frac{\omega}{2\sqrt{\zeta^2-1}}\left(\frac{e^{-\beta_1 t}}{-\beta_1} - \frac{e^{-\beta_2 t}}{-\beta_2}\right)\right] + \quad (7)$$

$$\frac{1}{2\omega\sqrt{\zeta^2-1}}\{[-\beta_2 x_0 - \dot{x}_0]e^{-\beta_1 t} + [\beta_1 x_0 + \dot{x}_0]e^{-\beta_2 t}\}$$

$$\dot{x}(t) = KV_{step}\left[-\frac{\omega}{2\sqrt{\zeta^2-1}}(e^{-\beta_1 t} - e^{-\beta_2 t})\right] + \quad (8)$$

$$\frac{1}{2\omega\sqrt{\zeta^2-1}}\{[-\beta_2 x_0 - \dot{x}_0](-\beta_1)e^{-\beta_1 t} + [\beta_1 x_0 + \dot{x}_0](-\beta_2)e^{-\beta_2 t}\}$$

-continued $$\int x(t)dt = KV_{step}\left[t - \frac{\omega}{2\sqrt{\zeta^2 - 1}}\left(\frac{(e^{-\beta_1 t} - 1)}{(-\beta_1)^2} - \frac{(e^{-\beta_2 t} - 1)}{(-\beta_2)^2}\right)\right] + \frac{1}{2\omega\sqrt{\zeta^2 - 1}}\left\{\frac{[-\beta_2 x_0 - \dot{x}_0](e^{-\beta_1 t} - 1)}{-\beta_1} + \frac{[\beta_1 x_0 + \dot{x}_0](e^{-\beta_2 t} - 1)}{-\beta_2}\right\} \quad (9)$$

$$t = \frac{\ln\left[\dfrac{\omega^2 KV_{step}}{\omega^2 KV_{step} - \beta_2(\beta_1 x_0 + \dot{x}_0)}\right]}{-\beta_2}. \quad (19)$$

3. The control system of claim 2, wherein the scheduling is performed using equation (19) to calculate a time for deceleration duration; using equations (7), (8) and (9) with the time for deceleration duration and then present position, velocity and acceleration as inputs to calculate predicted velocity, acceleration and change in position at the end of the second step; using equation (9) with the predicated velocity and acceleration of the end of the second step as inputs, to calculate the predicated change in position at the end of the third step; to sum the then present position with the calculated predicated change in position to obtain a predicated final position; and to advance to the second step if the predicated final position equals or goes beyond the desired final position.

4. The control system of claim 3, wherein, in the second step, elapsed time is measured, and when the elapsed time is equal to the calculated deceleration duration time, advancing to the third step.

5. The control system of claim 4, wherein, in the third step, zero voltage is applied for the duration of three time constants.

* * * * *